United States Patent [19]

Swiatowiec

[11] 4,122,527

[45] Oct. 24, 1978

[54] EMITTER COUPLED MULTIPLIER ARRAY

[75] Inventor: Frank J. Swiatowiec, Tempe, Ariz.

[73] Assignee: Motorola, Inc., Schaumburg, Ill.

[21] Appl. No.: 784,486

[22] Filed: Apr. 4, 1977

Related U.S. Application Data

[63] Continuation of Ser. No. 628,634, Nov. 4, 1975, abandoned.

[51] Int. Cl.² .............................. G06F 7/50; G06F 7/52
[52] U.S. Cl. ...................................... 364/787; 364/760
[58] Field of Search .................. 235/175; 364/787, 760

[56] References Cited

U.S. PATENT DOCUMENTS

| 3,249,746 | 5/1966 | Helbig et al. | 235/175 |
| 3,465,133 | 9/1969 | Booher | 235/175 |
| 3,932,734 | 1/1976 | Parsons | 235/175 |

OTHER PUBLICATIONS

C. W. Weller, "A High-Speed Carry Ckt. for Binary Adders", *IEEE Trans. on Computers*, vol. C-18, No. 8, Aug. 1969, pp. 728-732.

*Primary Examiner*—David H. Malzahn
*Attorney, Agent, or Firm*—Kenneth R. Stevens

[57] ABSTRACT

A high speed multiplier array implemented with a current switch emitter follower logic gate employs an inverted carry signal internal to the array. External carry signals received by the array are first inverted for internal processing. This implementation eliminates the necessity of employing a buffer gate between subarray integrated circuit chips or cells and thus decreases propagation delays in the overall array.

5 Claims, 4 Drawing Figures

EMITTER COUPLED MULTIPLIER ARRAY

This is a continuation of application Ser. No. 628,634, filed Nov. 4, 1975, now abandoned.

BACKGROUND OF THE INVENTION

This invention relates to an integrated circuit and more particularly, a 4-bit by 2-bit integrated circuit cell which can be arranged in a multiplier array.

The use of Booth's approach of multiplication by using the sequence of multiplier bits to control the digital multiplication routine is known. The order of binary 0's and binary 1's of the multiplier controls either the addition or subtraction of the multiplicand or the addition or subtraction zeros to the accumulated partial product. After each addition and subtraction, the results are shifted 1 bit to the right. This technique is extremely useful because it allows for complement two's multiplication.

Modified basic multiplier cells using this algorithm are possible, and moreover it can be extended to larger grouping of multiplier bits for more efficient multiplier cell configurations. This data manipulation only allows for the examination of two bits at any single point in time, however it can be extended to any number of adjacent bits and is referred to in the art as multiplier coding. In order to facilitate a 4-bit by 2-bit cell, three adjacent bits must be examined using quaternary data processing techniques. The truth table for the quaternary algorithm is as follows:

| Multiplier Bits | | | |
| --- | --- | --- | --- |
| $Y_1$ | $Y_0$ | $Y_{-1}$ | Operation |
| 0 | 0 | 0 | Add zero |
| 0 | 0 | 1 | Add multiplicand |
| 0 | 1 | 0 | Add multiplicand |
| 0 | 1 | 1 | Add 2 × multiplicand |
| 1 | 0 | 0 | Subtract 2 × multiplicand |
| 1 | 0 | 1 | Subtract multiplicand |
| 1 | 1 | 0 | Subtract multiplicand |
| 1 | 1 | 1 | Subtract zero |

The present invention decreases propagation delay time by implementing the 4-bit multiplier array in accordance with these known multiplying techniques by employing a current switch emitter follower type logic gate that allows an inverted carry signal to be passed directly to its adjacent cell internal to the array. External carry signals received by the least significant device in the array are inverted prior to processing within the cell array.

DESCRIPTION OF THE PREFERRED EMBODIMENTS

Figure 1:
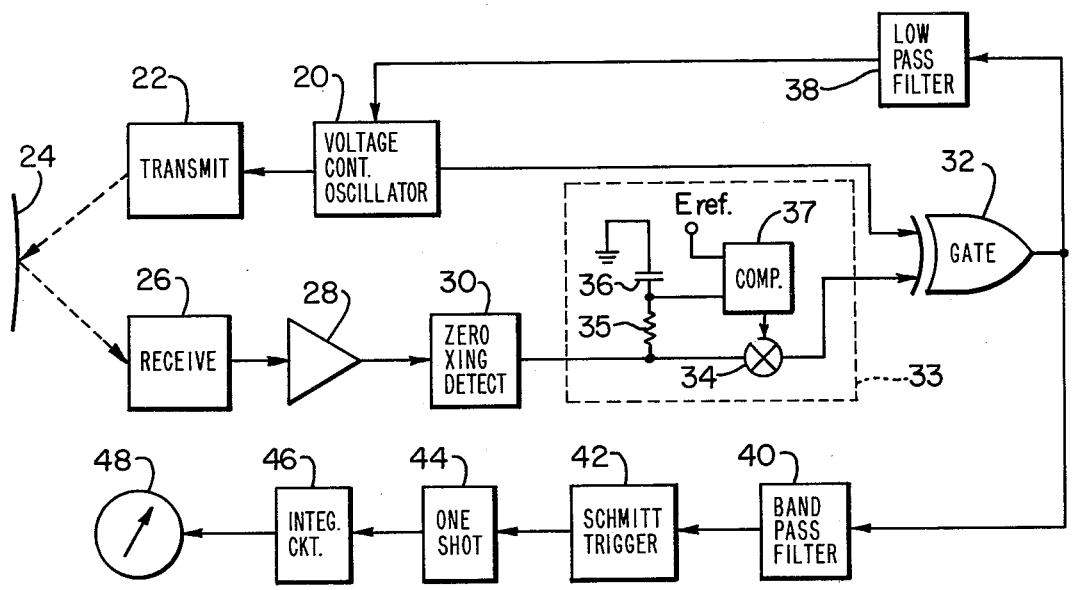
FIG. 1 shows an overall block diagram illustrating the implementation of the present invention as a 4-bit by 2-bit multiplier cell.

Now referring to FIG. 1, it illustrates the overall block diagram of a 4-bit by 2-bit cell or integrated circuit device which generates the function $S = X \cdot Y + K$, where $X$ = 4-bit multiplicand, $Y$ = 2-bit multiplier and $K = a$ 4-bit constant. The addition of the constant allows the device to be used in an iterative array of parts for larger words. The overall device includes a multiplier decoder section 10 and in a general sense is capable of receiving a plurality of bits $Y_{-1}$, $Y_0$ and $Y_1$ data bits on terminals 12, 14 and 16 respectively. The multiplier decoder 10 generates plurality of signals A, B and C on output lines 18, 20 and 22, respectively. Lines 18 and 20 selectively control shaft network 24 which is also adapted to receive multiplicand bits $X_{-1} \ldots X_3$ on a plurality of input lines generally designated at 26. The output lines from the shift network 24 are selectively coupled to a carry look ahead adder 30 via a complementor network generally shown at 32. Additionally, a sign bit adder 33 is selectively interconnected to the shift network 24, the complementor 32, and the carry look ahead adder 30.

The carry look ahead adder 30 is adapted to receive the constant signals K0 . . . K3 at a plurality of input terminals generally designated at 34. In addition, a mode control signal is received by the carry look ahead adder at terminal 36 and designated as M. The carry look ahead adder is selectively responsive to a carry in input $C_{IN}$ signal received at terminal 38. As previously described, the carry look ahead adder section 30 comprises a plurality of logic gates which are capable of directly receiving a Cin signal which when internal to the array is generated as $\overline{C_{IN}}$ or in the alternative when the signal received at terminal 38 is external to the array the logic circuit inverts the carry in signal for processing internal to the adder. The carry look ahead adder and the sign bit adder generates a plurality of output product signals on output lines generally designated at 40 and designated by S0, S1, S2, S3, $\overline{N+4}$, S4, and S5.

The arrangement of FIG. 1 employs the inputs to generate the control signals to the shifter and the carry look ahead adder 30. Also, a polarity control signal $\overline{P}$ (not shown) is used to allow the 4-bit by 2-bit cell or device either to operate in positive or negative logic and is generated in the sign bit adder section 33. The control signals A, B and C within the overall device are generated in accordance with the following equations:

$$A = Y_{-1} \oplus Y_0 \text{ (1 times multiplicand)}$$

$$B = Y_{-1} Y_0 \overline{Y_1} + \overline{Y_{-1}} \overline{Y_0} Y_1 \text{ (2 times multiplicand)}$$

$$\overline{C} = \overline{P} \, \overline{Y_1} + \overline{Y_{-1}} \overline{Y_0} Y_1 + P Y_1 (\overline{Y_{-1}} + \overline{Y_0})$$
(add/substract)

The $\overline{P}$ input is tied to a high logic level or ground for positive logic operation as later described in connection with the circuit of FIG. 3.

The shift network 24 is a multiplexer that ripples through number X (1 times multiplier), shifts the number X by 1 bit (2 times multiplicand), or sets the output to zero. This network is controlled by decoder functions A and B generated as described above.

The adder section 30 follows a shift network which performs the actual multiplication. Adder 30 produces the sum or difference of the newly formed partial product and the accumulated partial product (constant K). Subtraction is accomplished by inverting the shifted product and doing a two's complement addition. The carry in of the least significant bit must be a logic one during subtraction.

The two most significant bits of the product, S4 and S5 are used for sign detection and overflow for a two's complement multiplication. These outputs are used only as the 2 most significant bits of the accumulated product at each addition level within a multipler array.

Overflow can either occur as a result of two times the multiplicand, and/or of an addition or subtraction. To show all possible conditions including overflow, the most significant bit S5 must carry a negative binary weight. To illustrate this for a 4-bit by 2-bit multiplication operation plus constant, the following addition is employed:

$$\begin{array}{cccccc} & X'_4 \cdot X'_3 & X'_2 & X'_1 & X'_0 & \text{shifter outputs} \\ + & K_3 \cdot K_3 & K_2 & K_1 & K_0 & \text{constant} \\ \hline S_5 & S_4 \cdot S_3 & S_2 & S_1 & S_0 & \text{sum} \end{array}$$

The shift network produces 5 product bits (maximum value of 2 times multiplicand) and a 4-bit constant is added to the least significant end of the product. The $K_3$ bit is repeated to hold the proper binary weight. Because $S_5$ has a negative weight all possible combinations are represented properly. If no overflow occurs $S_4 = S_5$, and $S_4$ can be used as a sign bit. Under overflow conditions $S_4 \neq S_5$, and overflow can be detected by Exclusive-Oring $S_4$ and $S_5$.

Figure 2:
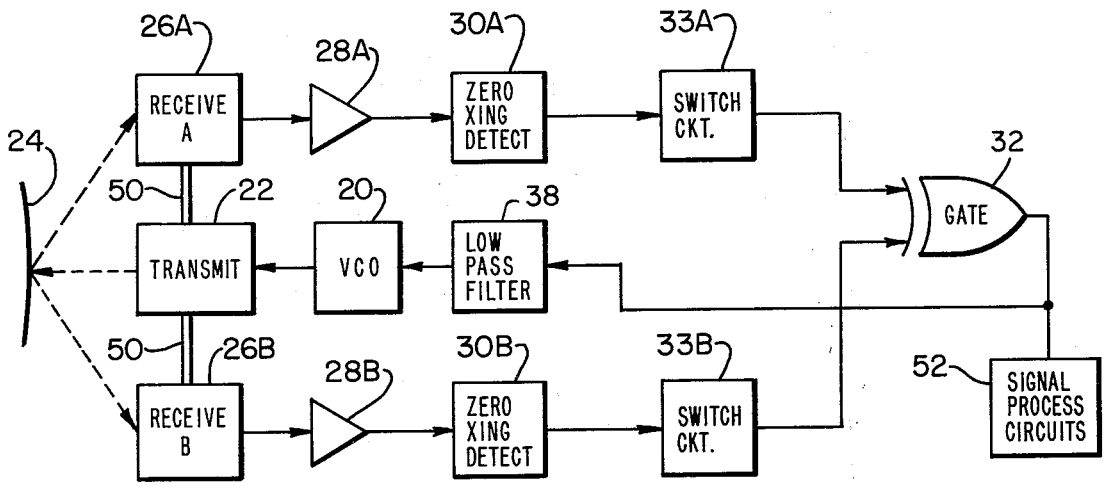
FIG. 2 is a block diagram illustrating the interconnection of two 4-bit by 2-bit cells in a simplified multiplier array configuration.

Now referring to FIG. 2 it illustrates two 4-bit by 2-bit multiplier cells or chips being interconnected to form an 8-bit by 2-bit multiplier. Each of the integrated circuit cells 50 and 52 are selectively interconnected to form the 8-bit 2-bit multiplier array and each of the cells or devices are capable of performing the overall functions described with respect to FIG. 1. For purposes of simplicity the polarity control function described with respect to FIG. 1 has not been specifically shown in the FIG. 2 embodiment. Otherwise the array is capable of accepting the two multiplier bits Y0 and Y1 and the 8-bit multiplicand number X0 ... X6, XS at a plurality of input lines 53. In addition, each of the other input lines previously described with respect to an individual 4-bit by 2-bit device are shown being connected to a zero or binary low signal in the 8-bit by 2-bit implementation. For example, K0 ... K3 input lines for each of the devices or cells 50 and 52 are connected to a down level in this minimal array implementation. Also, in accordance with the previously described relationships the X3 input line of device 50 is connected to the X-1 line via line 60. Similarly, the Y0, Y1 and $\overline{C_N}$ terminals of device 50 are interconnected to the Y0 and Y1 terminals of device 52 via lines 62 and 64 respectively.

A mode control terminal 66 on cell device or 50 is raised to a high level to indicate that any carries coming external to the array should be inverted for internal processing within the device 50. The mode control line 68 however on device 52 is maintained at a low level in order to indicate that the inverted carry signal processed within device 50 is passed directly to the device 52 as previously discussed. In accordance with the previous relationships the product signals Z0 ... Z7 are generated on a plurality of output lines 69 in the 8-bit by 2-bit array. The sign bit and overflow can be determined from the two most significant bits of the array lines 70 and 72. If no overflow occurs line 70=72 and 72 can be used as a sign bit set. If overflow occurs line 70≠72 and overflow can be detected by Exclusive-Oring line 70 and 72. The circuit aspects of the present invention are best illustrated in FIG. 3 which is directed to the specific type of current switch logic circuit which can be used for implementing the carry look ahead adder generally described in FIG. 1. The detailed description of the single 4-bit by 2-bit device or cell, FIG. 1, and the interconnection to two 4-bit by 2-bit cells or devices to form an 8-bit by 2-multiplier, as shown in FIG. 2 is necessary in order to illustrate an array embodiment of the present invention.

Figure 3:
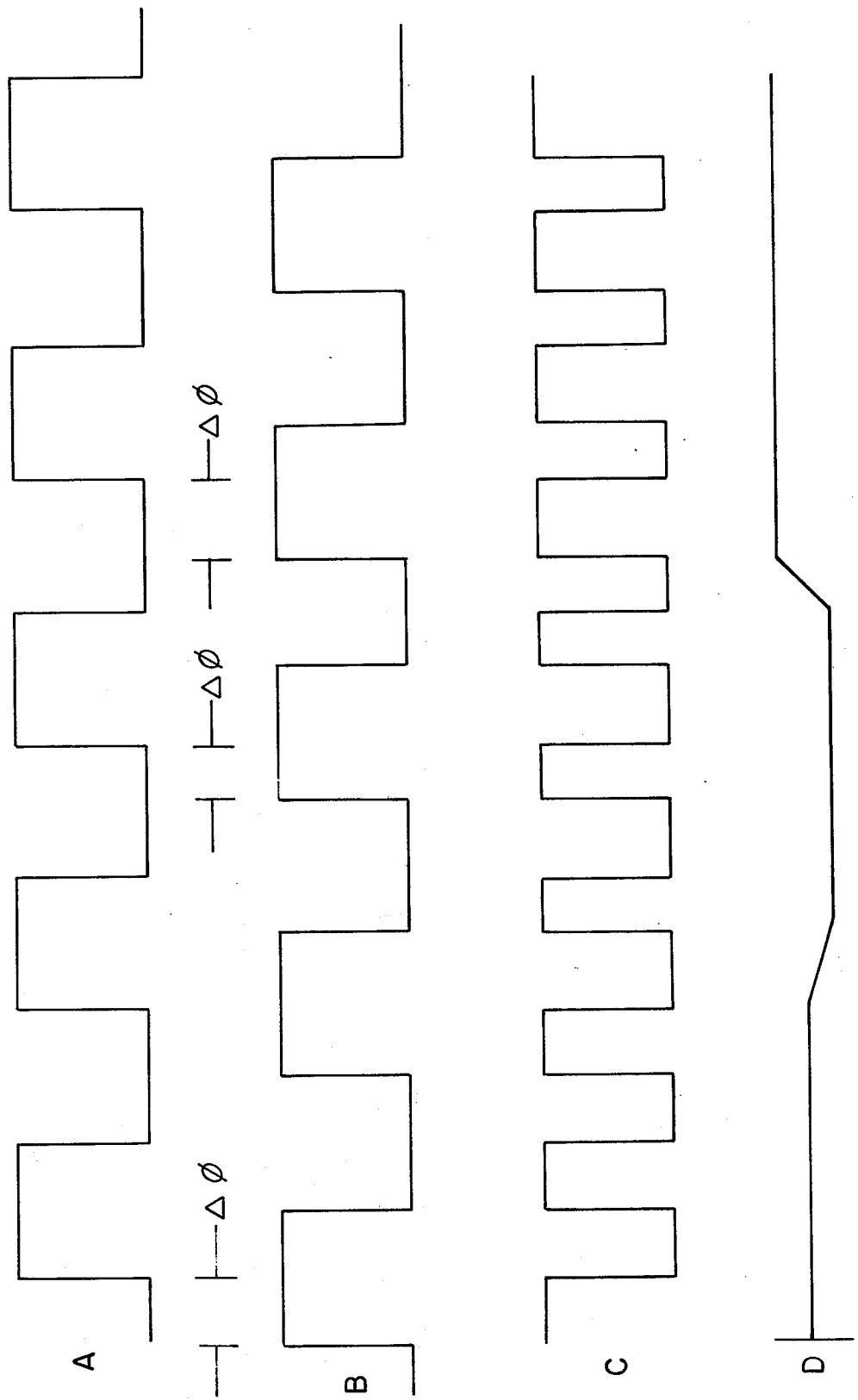
FIG. 3 illustrates an electrical schematic diagram of a basic current switch emitter follower logic gate which can be employed internal to the cell for generating inverted carry signals.

Now referring to FIG. 3, it illustrates a current switch emitter follower circuit for obtaining an inverted carry signal without exposing the next device or cell to a collector dotted output node. Thus, the necessity of providing an output circuit is eliminated and propagation delay times between cells or devices are reduced. The logic the gate generates is given by the equation $$\overline{C_{OUT}} = \overline{(C_{IN} \cdot (X_0 \oplus K_0) + (X_0 \cdot K_0))},$$

assuming that a more positive voltage represents a logic "1".

The circuit includes an input Exclusive Or circuit 90 for receiving the carry in signal $C_{IN}$ at terminal 92 and a mode control signal M at input terminal 94. When the circuit of FIG. 3 is employed internal to the array, the mode control line or terminal line 94 is kept at a low level and thus the carry in signal $C_{IN}$ applied at terminal 92 is passed directly to the base terminal of input switching transistor 96. On the other hand, if the carry in signal is being received from the outside world, then the line 94 of Exclusive Or circuit 90 is maintained at a high level and the carry in signal $C_{IN}$ is inverted and applied to the base of switching transistor 96 as $\overline{C_{IN}}$.

Commonly coupled to input transistor 96 is a similar switching transistor 100 having its emitter commonly coupled with the emitter of transistor 96 at node 102. A pair of reference transistors 104 and 106 are commonly coupled at their collector terminals to node 108 and then via resistor 100 to a $V_{CC}$ supply voltage equal to approximately 0.0 volts in the preferred embodiment. The base terminals of transistors 104 and 106 are commonly coupled to a reference voltage supply $V_{BB}$ of approximately $-1.3$ volts. A pair of current sources are constituted by transistors 111 and 112 coupled to their respective resistors 114 and 116 and then to the negative supply voltage $V_{EE}$ terminal 120, which in the preferred embodiment is approximately $-5.2$ volts. An appropriate bias supply of $V_{CS}$ is coupled to the base terminals of transistors 110 and 112 in a conventional manner. The base terminal of transistor 100 receives a logic signal indicated by the signal $\overline{X_0 \oplus K_0}$ representative of the Exclusive NOR function. Another switching transistor 122 coupled at its collector terminal to $V_{CC}$ and at its emitter terminal to the current source transistor 112 receives a logic signal $\overline{X_0 \cdot K_0}$ units base terminal and provides the AND function. The $\overline{C_{OUT}}$ signal is generated at output terminal 130 via emitter follower output transistors 132 having its base coupled to the node 108 via line 134 and its collector terminal connected to the voltage supply $V_{CC}$. The emitter terminal of transistor 132 is also connected to negative supply voltage $V_{EE}$ by means of resistor 136.

Figure 4:
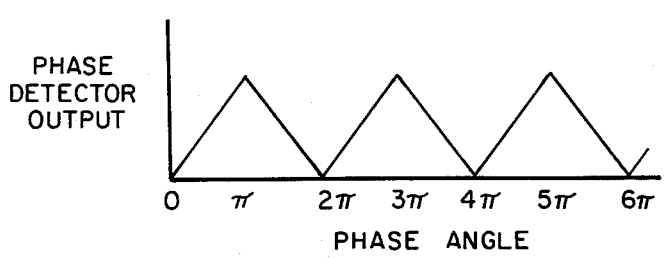
FIG. 4 depicts the truth table for the basic logic circuit illustrated in FIG. 3.

It is seen that the function $\overline{X_0 \oplus K_0}$ is mutually exclusive to $\overline{X_0 \cdot K_0}$ since they can never both be equal to a binary 0 at the same time. The truth table of FIG. 4 illustrates that they are mutually exclusive. When the signal at the base of terminal 96 and the signal represented by $\overline{X_0 \oplus K_0}$ are both equal to a binary 0 or down level then current flows through transistors 104. When only the binary signal represented by $\overline{X_0 \cdot K_0}$ is equal to a down or binary 0 level then current flows through transistor 106. Since the $\overline{X_0 \oplus K_0}$ and $\overline{X_0 \cdot K_0}$ functions cannot both be low or binary 0 at the same time then only a single current flows through resistor 110.

The $\overline{C_{OUT}}$ signal generated at output 130 thus represents a negative carry signal. When this emitter coupled logic gate is implemented internal to the array the $\overline{C_{OUT}}$ signal is passed directly to its adjacent cell or device internal to the array without requiring exposure of a collector dotted node to the outside world or the necessity of a buffer gate. Accordingly, by employing the inverted carry signal internal to the array the propagation times within the multiplier configurations are decreased and overall operating speeds are improved.

I claim:

1. A multiplier circuit comprising:
   a. a carry lookahead added circuit including a first cell comprising input means for receiving a carry-in signal $C_{IN}$ and for receiving a first control signal for selectively transmitting either a true or inverted signal $\overline{C_{IN}}$ of the carry-in signal $C_{IN}$, a cell output terminal, and an emitter-coupled-logic circuit coupled between said input means and the said cell output terminal for receiving a first logic signal $\overline{X \oplus K}$ and a second logic signal $\overline{X \cdot K}$, and being responsive to said transmitted true or inverted signal $\overline{C_{IN}}$ for generating a first internal carry-out signal $\overline{C_{OUT}}$ at said cell output terminal.

2. A multiplier circuit as in claim 1 wherein:
   a. said emitter-coupled-logic circuit further comprises a pair of input switching transistors having their base terminals coupled respectively to said first logic signal $\overline{X \oplus K}$ and to said second logic signal $\overline{X \cdot K}$, and an emitter follower output transistor coupled to said pair of input switching transistors for generating at its emitter terminal said first internal carry-out signal $\overline{C_{OUT}}$, where $$\overline{C_{OUT}} = \overline{(C_{IN} \cdot (X \oplus K)) + (X \cdot K)}$$

3. A multiplier circuit as in claim 1 wherein said carry lookahead adder circuit further comprises:
   a. a second cell identical to said first cell, the input means of said second cell being coupled to said first cell output terminal for receiving said first internal carry-out signal $\overline{C_{OUT}}$, and said input means of said second cell being responsive to a second control signal for transmitting said first internal carry-out signal $\overline{C_{OUT}}$ in its true mode through said second cell for generating a second internal carry-out signal $\overline{C_{OUT}}$ at said second cell output terminal.

4. A multiplier circuit as in claim 3 wherein said carry lookahead adder circuit generates a plurality of least-significant product signals, said multiplier circuit further comprising:
   a. decoder means for receiving input multiplier bits and for providing shift control signals and complement control signals,
   b. shift-complement means for receiving input multiplicand bits, said shift-complement means being responsive to said shift control signals and to said complement control signals for selectively shifting and complementing said input multiplicand bits,
   c. sign-bit adder means coupled to said shift-complement means and to said carry lookahead adder circuit for generating a plurality of most-significant product signals, whereby said multiplier bits and said multiplicand bits are multiplied to provide a plurality of product signals.

5. A multiplier circuit as recited in claim 1 wherein said carry lookahead circuit further comprises:
   a. one or more second cells being identical to said first cell, the input means of each of said second cells receiving a corresponding one or more second carry-in signals $C_{IN}$ and receiving a corresponding one or more second control signals, the input means of said first cell and the input means of each of said one or more second cells being operative to transmit a true signal of its received carry-in signal $C_{IN}$ when said received carry-in signal $C_{IN}$ is generated by either said first cell or by said one or more second cells, and being operative to transmit an inverted signal of its received carry-in signal $C_{IN}$ when said received carry-in signal $C_{IN}$ is generated external to said first cell and external to said one or more second cells.

* * * * *